United States Patent
Hayashi (10) Patent No.: US 10,886,707 B2
(45) Date of Patent: Jan. 5, 2021

(54) SPARK PLUG TO BE MOUNTED ON AN INTERNAL COMBUSTION ENGINE HAVING A WATER SPRAY INJECTOR

(71) Applicant: DENSO CORPORATION, Kariya (JP)

(72) Inventor: Kosuke Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/850,249

(22) Filed: Apr. 16, 2020

(65) Prior Publication Data

US 2020/0335948 A1 Oct. 22, 2020

(30) Foreign Application Priority Data

Apr. 18, 2019 (JP) .................................. 2019-079523

(51) Int. Cl.
*H01T 13/20* (2006.01)
(52) U.S. Cl.
CPC .................................... *H01T 13/20* (2013.01)

(58) Field of Classification Search
CPC ....................................................... H01T 13/20
See application file for complete search history.

(56) References Cited

FOREIGN PATENT DOCUMENTS

| JP | 2008-138561 | 6/2008 |
|----|-------------|--------|
| JP | 2013-055022 | 3/2013 |
| JP | 2018-184909 | 11/2018 |

*Primary Examiner* — Joseph L Williams
(74) *Attorney, Agent, or Firm* — Nixon & Vanderhye PC (57) ABSTRACT

A spark plug has a housing of a cylindrical shape and an insulator of a cylindrical shape supported inside the housing. A position of an insulator distal end at a distal end of the insulator is arranged equal to or forward of a position of a distal end of the housing in an axial direction of the spark plug. The spark plug satisfies a relationship designated by an equation, $-0.064L^2+0.26E+0.53 \leq T \leq 0.07L^2-0.35L+1.36$, where T indicates a thickness of the insulator distal end of the insulator, and L indicates an insulator projection length measured from the position of the distal end of the housing to the position at the insulator distal end surface of the insulator.

4 Claims, 7 Drawing Sheets

SPARK PLUG TO BE MOUNTED ON AN INTERNAL COMBUSTION ENGINE HAVING A WATER SPRAY INJECTOR

CROSS-REFERENCE TO RELATED APPLICATION

This application is related to and claims priority from Japanese Patent Application No. 2019-079523 filed on Apr. 18, 2019, the contents of which are hereby incorporated by reference.

TECHNICAL FIELD

The present disclosure relates to spark plugs.

BACKGROUND

For example, there is an internal combustion engine having a water spray injector capable of spraying water mist into a combustion chamber of the internal combustion engine. This structure prevents knocking in the internal combustion engine, increases a compression ratio of the internal combustion engine and improves fuel supply efficiency into the combustion chamber and thermal efficiency of the internal combustion engine.

In general, a spark plug is mounted on a cylinder head of the internal combustion engine. The spark plug has a housing, an insulator, a central electrode and a ground electrode. The insulator is supported by and fixed to the housing. The central electrode is arranged in the insulator and is extended to the outside of the spark plug. The central electrode and the ground electrode are arranged to form a discharge gap. The distal end of the spark plug is arranged and exposed to a fuel mixture gas fed into the combustion chamber. When a predetermined electric power is supplied to the central electrode and the ground electrode, the fuel mixture gas ignites and a spark is generated in the discharge gap.

Water mist sprayed by the water spray injector is often attached on the surface of the distal end of the insulator in the spark plug arranged in the combustion chamber of the internal combustion engine previously described. Because the insulator of the spark plug is working at a high temperature in the combustion chamber, a temperature of the distal end pf the insulator is suddenly and drastically reduced when water mist sprayed by the water spray injector becomes attached on the surface of the distal end of the insulator of the spark plug. This causes a possible drawback of generating cracks in the insulator of the spark plug due to the thermal stress caused by the sudden temperature decrease.

SUMMARY

It is desired for the present disclosure to provide a spark plug to be mounted on an internal combustion engine. the internal combustion engine having a combustion chamber, an intake air passage supplying intake air into the combustion chamber and a water spray injector. The water spray injector sprays water mist into at least one of the combustion chamber and the intake air passage. The spark plug has a housing having a cylindrical shape, and an insulator having a cylindrical shape supported inside the housing. In the spark plug, a position of an insulator distal end at a distal end of the insulator is arranged equal to or forward of a position of a distal end of the housing in an axial direction of the spark plug. The spark plug satisfies a relationship designated by the equation (I), $-0.064L^2+0.26L+0.53 \leq T \leq 0.07L^2-0.35L+1.36$ … (I), where T indicates a thickness mm of the insulator distal end, and L indicates an insulator projection length mm measured from the position of the distal end of the housing to the position at the insulator distal end surface of the insulator.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Hereinafter, various embodiments of the present disclosure will be described with reference to the accompanying drawings. In the following description of the various embodiments, like reference characters or numerals designate like or equivalent component parts throughout the several diagrams.

EXEMPLARY EMBODIMENT

A description will be given of a spark plug 1 according to an exemplary embodiment with reference to FIG. 1 to FIG. 4.

Figure 1:
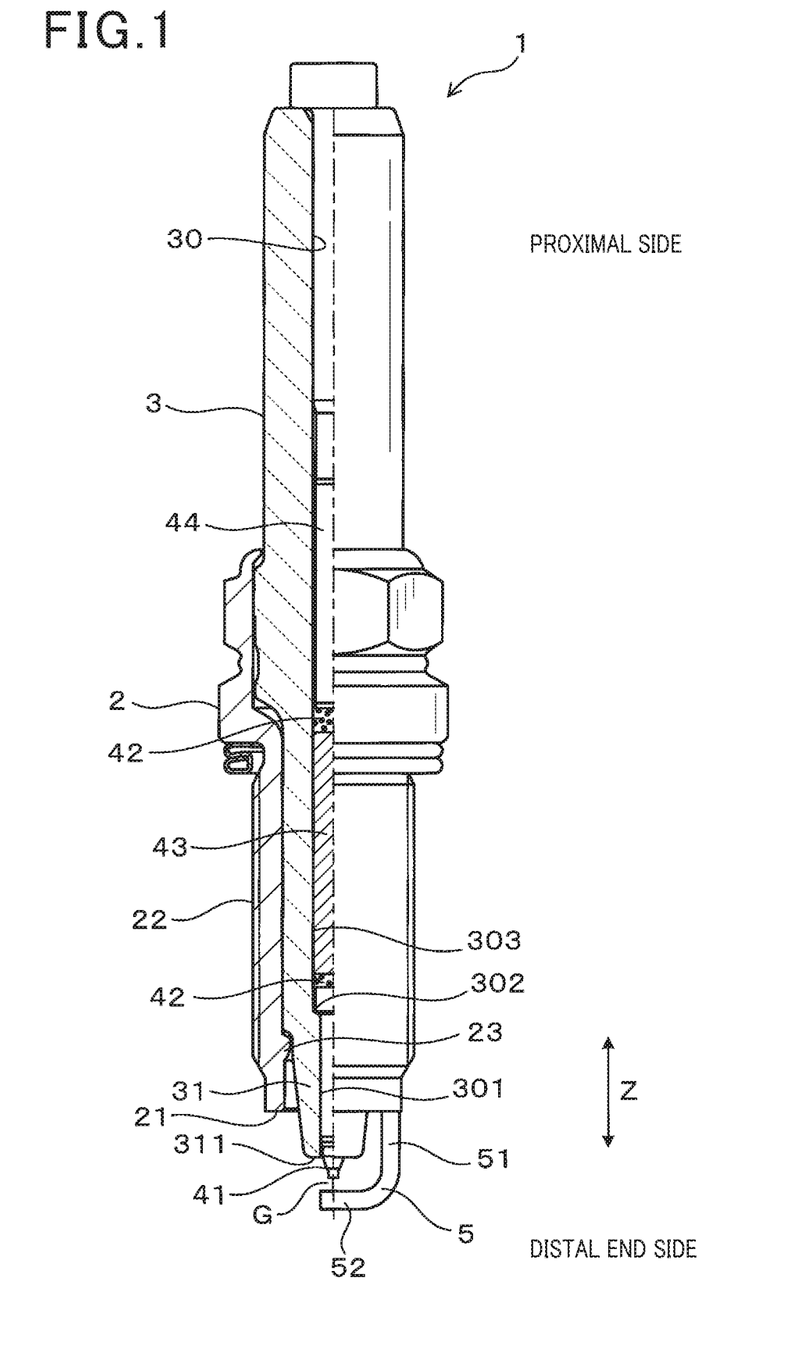
FIG. 1 is a view showing a plug cross section in an axial direction of a spark plug according to an exemplary embodiment of the present disclosure.
Figure 2:
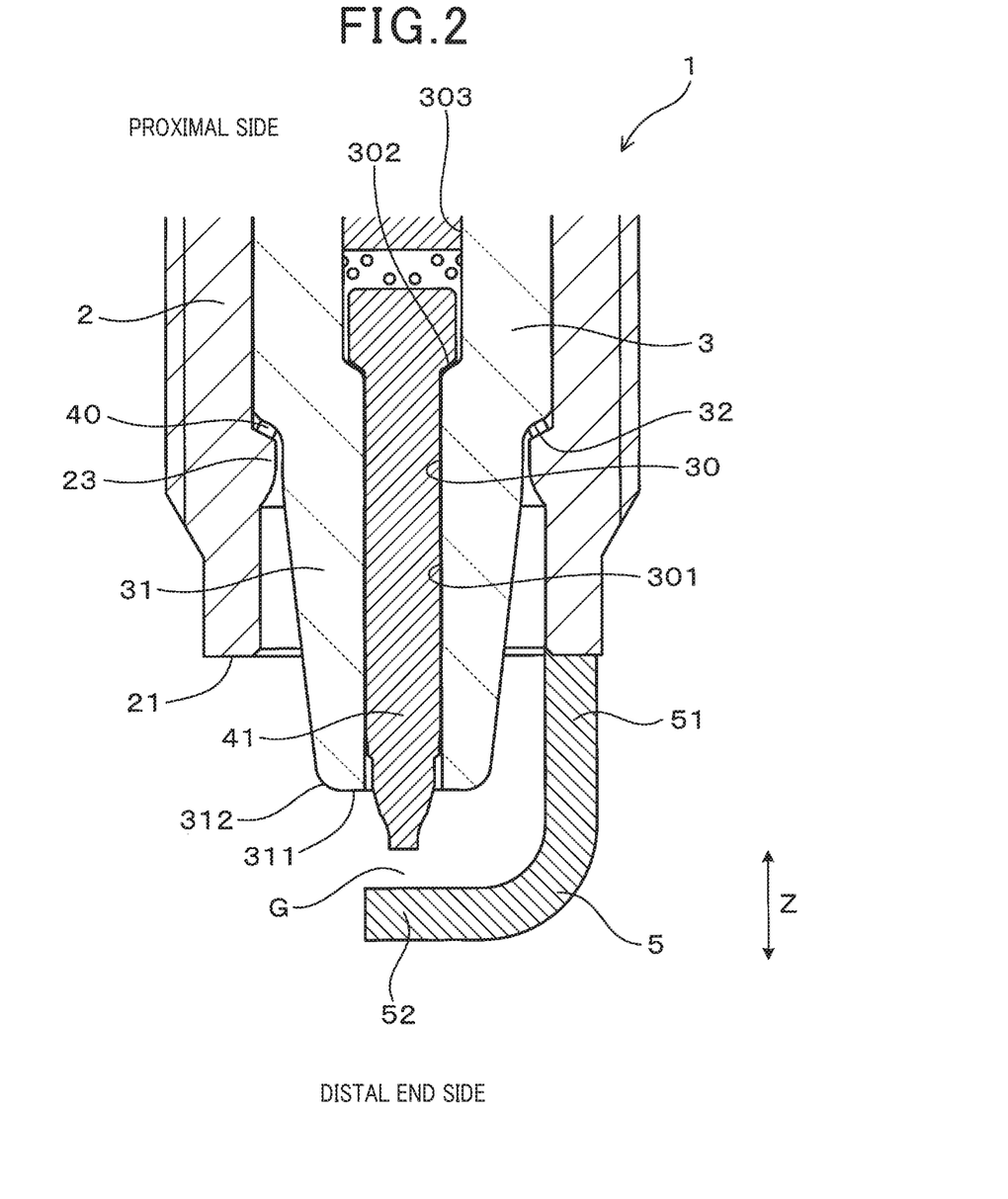
FIG. 2 is a view showing a plug cross section at a distal end of the spark plug parallel with the axial direction of the spark plug according to the exemplary embodiment shown in FIG. 1.
Figure 3:
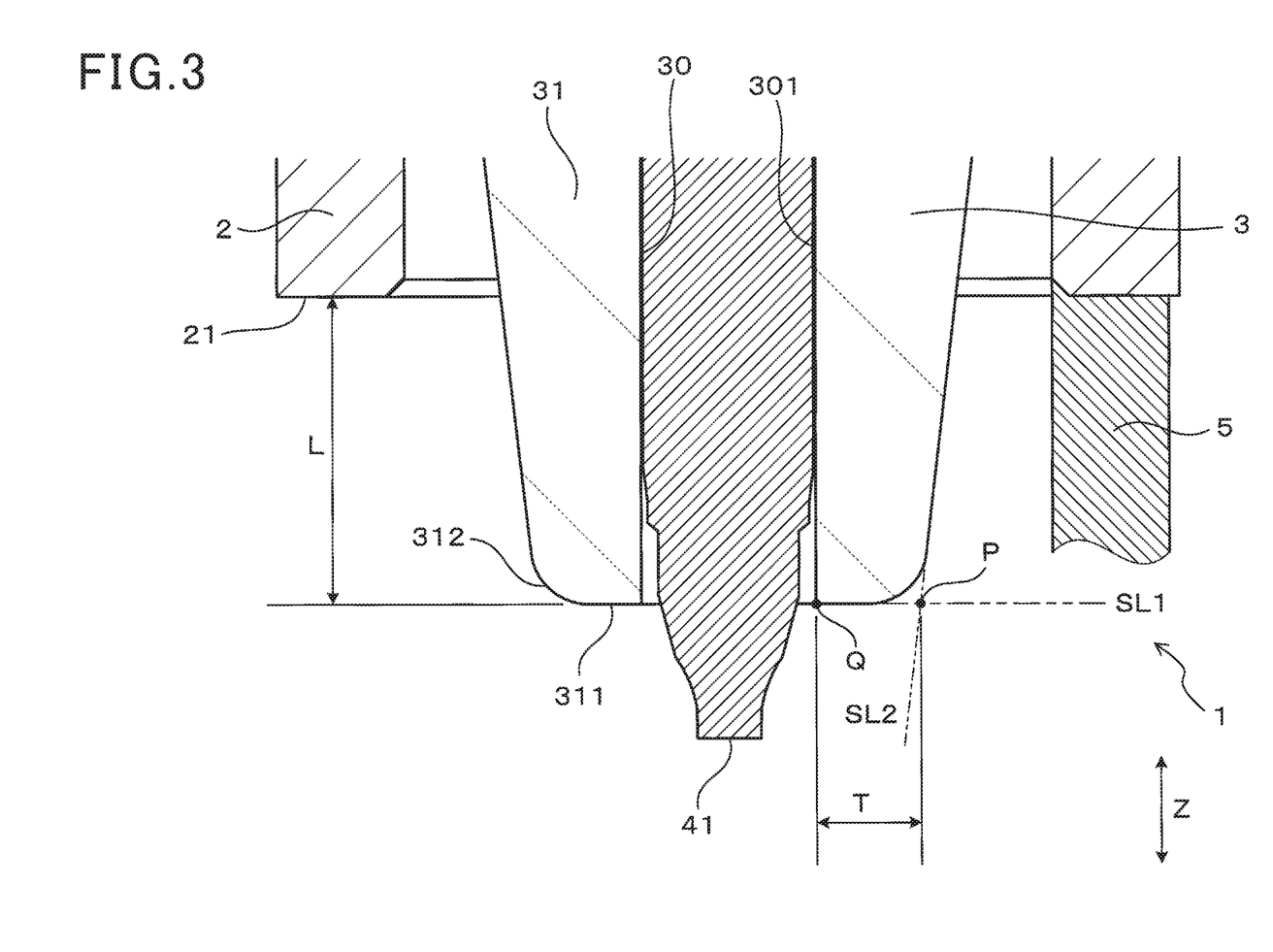
FIG. 3 is a view showing an enlarged plug cross section at the distal end of the spark plug according to the exemplary embodiment so as to explain a thickness of an insulator leg part at the distal end of an insulator, and a length of a projection part of the insulator leg part measured from a position of the distal end surface of the housing to a position at an insulator distal end surface of the insulator in the spark plug shown in FIG. 1 and FIG. 2.
Figure 4:
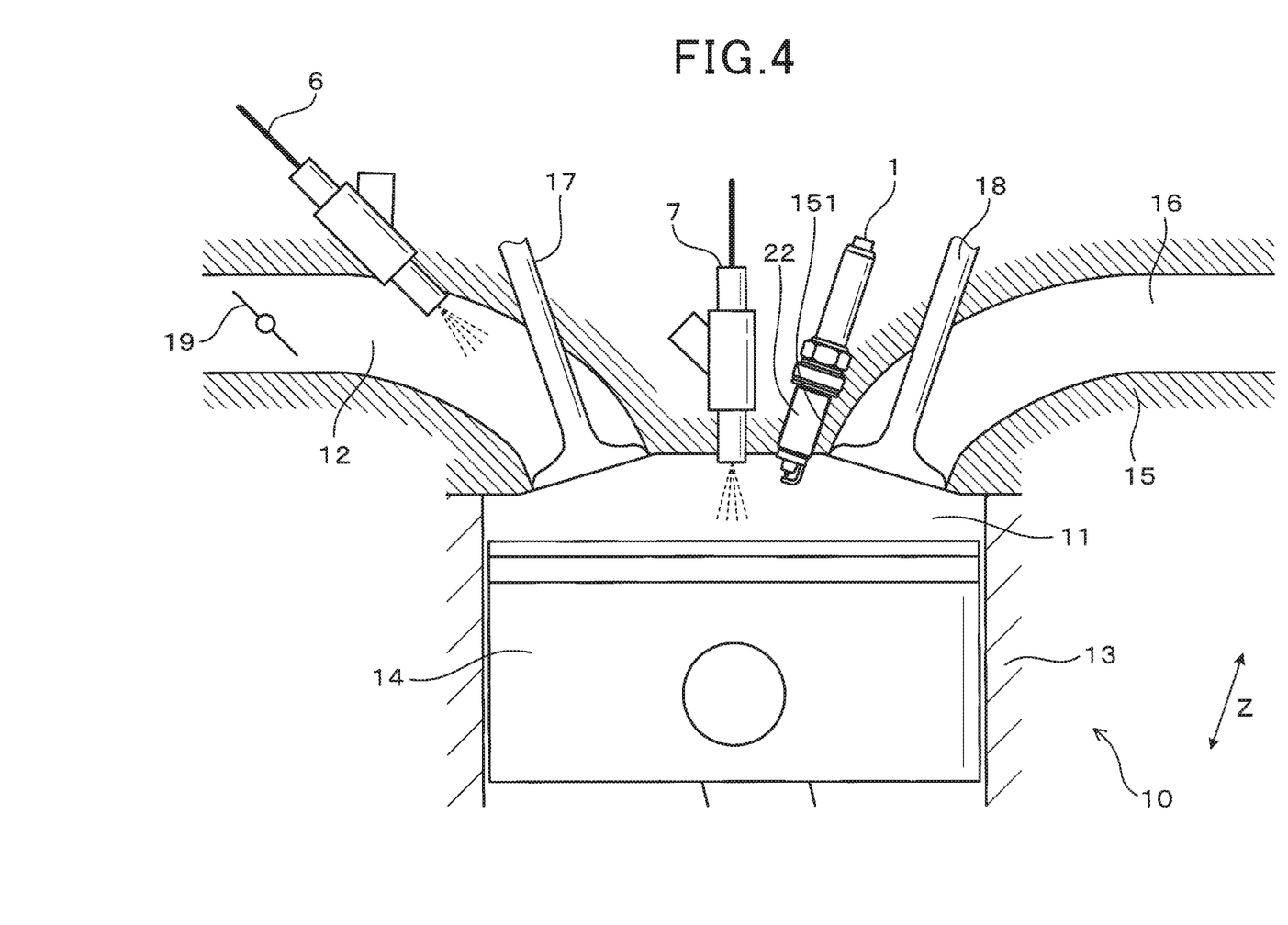
FIG. 4 is a view schematically showing a cross section of part of an internal combustion engine equipped with the spark plug according to the exemplary embodiment shown in FIG. 1 to FIG. 3.

FIG. 1 is a view showing a cross section in an axial direction Z of the spark plug 1 according to the exemplary embodiment. FIG. 2 is a view showing a cross section of a distal end of the spark plug 1 shown in FIG. 1. FIG. 3 is a view showing an enlarged plug cross section at the distal end of the spark plug 1 so as to explain the thickness T (mm) of the insulator distal end of the insulator 3, and to explain a length L of a projection part of the insulator leg part 31 of the insulator 3. The length L is measured from a position of the distal end surface 21 of the housing 2 to a position at the insulator distal end surface 311 of the insulator 3 in the spark plug 1. FIG. 4 is a view schematically showing a cross section of part of an internal combustion engine 10 equipped with the spark plug 1 shown in FIG. 1 to FIG. 3.

As shown in FIG. 4, the spark plug 1 according to the first exemplary embodiment is mounted on the internal combustion engine 10. The internal combustion engine 10 has a water spray injector 6 which sprays water mist to at least one of a combustion chamber 11 and an intake air passage 12. Air is supplied to the inside of the combustion chamber 11 through the intake air passage 12.

As shown in FIG. 1, the spark plug 1 according to the exemplary embodiment has a housing 2 and an insulator 3. The housing 2 has a cylindrical shape. The insulator 3 is arranged in and fixed to the housing 2. Similar to the housing 2, the insulator 3 has a cylindrical shape.

As shown in FIG. 1 to FIG. 3, the position at the distal end of the insulator 3, i.e. the position of an insulator distal end surface 311 of the insulator 3 is equal to the position of a distal end of the housing 2 in the axial direction Z of the spark plug 1. The structure and behavior of the insulator distal end surface 311 will be explained later in detail. It is also acceptable that the position of the insulator distal end surface 311 is arranged forward in the axial direction Z of the spark plug 1, i.e. is projected from the position of the distal end of the housing 2 in the axial direction Z of the spark plug 1.

As shown in FIG. 3, the spark plug 1 according to the exemplary embodiment has a structure which satisfies a relationship designated by the equation (I).

$$-0.064L^2+0.26L+0.53 \leq T \leq 0.07L^2-0.35L+1.36 \qquad (I),$$

where T indicates a thickness (mm) of the insulator distal end of the insulator 3, and L indicates an insulator projection length L (mm) measured from the position of the distal end of the housing 2 to the position at the insulator distal end surface 311 of the insulator 3.

A description will be given of the improved structure and behavior of the spark plug 1 according to the exemplary embodiment in detail.

It is possible to apply the spark plug 1 as an ignition device to internal combustion engines in various applications, for example, in automobiles, cogeneration systems, etc.

A proximal end in the axial direction Z of the spark plug 1 is connected to an ignition coil (not shown). As shown in FIG. 4, the distal end in the axial direction Z of the spark plug 1 is arranged in the inside of the combustion chamber 11 of the internal combustion engine 10.

Through the specification, the axial direction Z of the spark plug 1 indicates a direction along which a central axial of the spark plug 1 is extended. As previously explained, the distal end of the spark plug 1 is arranged in the inside of the combustion chamber 11 of the internal combustion engine 10. The distal end is opposite to the proximal end along the axial direction Z of the spark plug 1. A radial direction represents the radial direction of the spark plug 1.

The housing is made of heat resistant metal material such as carbon steel, nickel, iron nickel alloy, stainless steel, etc. For example, the spark plug 1 according to the exemplary embodiment made of carbon steel.

As shown in FIG. 1, a screw attachment 22 is formed on the outer periphery of the distal end of the housing 2. As shown in FIG. 4, the spark plug 1 is fixed to the internal combustion engine 20 by screwing the screw attachment 22 to a plug hole 151 of a cylinder head 15 of the internal combustion engine 10. When the spark plug 1 is attached to the cylinder head 15, the distal end of the spark plug 1 is exposed to the inside of the combustion chamber 11 of the internal combustion engine 10.

As shown in FIG. 1 and FIG. 2, the housing 2 has a housing protruding part 23, which protrudes inwardly, as a part of the inner circumferential surface of the housing 2.

The housing protruding part 23 is formed on the inner circumferential surface of the distal end of the screw attachment 22. The housing protruding part 23 is formed around the overall inner circumferential surface of the housing 2 and has a ring shape.

As shown in FIG. 2, the insulator 3 is fixed to the surface of the distal end of the housing protruding part 23 through a metal packing 40. The metal packing 40 is arranged in contact with the housing protruding part 23 and the insulator 3 so as to seal a gap between them.

The insulator 3 is made of insulation material. The spark plug 1 according to the exemplary embodiment has the insulator 3 made of alumina as insulation material. As shown in FIG. 1 and FIG. 2, the insulator 3 has an axial through hole 30 which is penetrated along the axial direction Z of the insulator 3. The insulator 3 has a cylindrical shape. The insulator 3 is supported by the housing 2. The distal end and the proximal end of the insulator 3 protrude outside from the housing 2.

As shown in FIG. 2, an insulator support surface 32 is formed on the outer circumferential surface of the insulator 3. The insulator support surface 32 is supported by the distal end surface of the housing protruding part 23 through the packing 40. The insulator support surface 32 has a taper shape which is tapered inwardly toward the distal end side of the insulator 3.

The insulator 3 has an insulator leg part 31 formed at the distal end side of the insulator support surface 32. The outer circumferential surface of the insulator leg part 31 has a taper shape, a diameter of which is gradually reduced toward the distal end side of the insulator 3.

When the spark plug 1 is mounted on the cylinder head 15 of the internal combustion engine 10, the surface of the insulator leg part 31 is exposed to the mixture gas introduced in the combustion chamber of the internal combustion engine 10. Further, when the spark plug 1 is mounted on the cylinder head 15 of the internal combustion engine 10, a gap formed between the outer circumferential surface of the insulator leg part 31 and the inner circumferential surface of the housing 1 communicates with the inside of the combustion chamber 11.

As shown in FIG. 2 and FIG. 3, the distal end of the insulator leg part 31 projects from the distal end surface 21 of the housing 2. The distal end surface 21 of the housing 2 has a ring shape on the surface which is orthogonal to the axial direction Z of the housing 2.

The insulator 3 has the insulator distal end surface 311 formed in a ring shape on a surface which is orthogonal to the axial direction Z of the insulator 3. As shown in FIG. 2 and FIG. 3, an inner circumferential end of the insulator distal end surface 311 communicates with the inner wall of the axial through hole 30.

An insulator distal end corner part 312 formed between the insulator distal end surface 311 and the outer circumferential surface of the insulator leg part 31 is formed to have a round shape. That is, the insulator distal end corner part 312 has a round shape which is curved smoothly connecting the insulator distal end surface 311 to the outer circumferential surface of the insulator leg part 31. The insulator distal end surface 311 is formed adjacent with the insulator distal end corner part 312.

As shown in FIG. 3, the spark plug 1 according to the exemplary embodiment has the improved structure which satisfies the relationship designated by the following equation (I).

$$-0.064L^2+0.26L+0.53 \leq T \leq 0.07L^2-0.35L+1.36 \qquad (I),$$

where T indicates the thickness (mm) of the insulator distal end of the insulator distal end of the insulator 3, and L indicates the insulator projection length L (mm) measured from the position of the distal end of the housing 2 to the position of the distal end of the insulator 3.

That is, the thickness T (mm) of the insulator distal end represents a length (mm) in a radial direction between a position Q (see FIG. 3) at the inner circumferential end of the insulator distal end surface 311 and a virtual cross point P (see FIG. 3) on a plug cross section of the spark plug 1. The virtual cross point P will be explained later.

FIG. 2 shows a plug cross section, and FIG. 3 shows an enlarged plug cross section of the spark plug 1 parallel with the axial direction Z of the spark plug 1 and passing through the central axis of the spark plug 1.

The virtual cross point P represents a cross point of a first vertical line SL1 and a second virtual line SL2. The first virtual line SL1 extends in a formation direction along which the insulator distal end surface 311 is formed. This formation direction is perpendicular to the axial direction Z of the spark plug 1 according to the exemplary embodiment. The second virtual line SL2 extends toward a formation direction along which the outer circumferential surface if the insulator leg part 31 is formed. It is acceptable for the insulator distal end corner part 312 to have the thickness T of the insulator distal end even if it is formed as a taper shape, a rectangular shape, and a round shape, etc.

The insulator projection length L (mm) is a length measured in the axial direction Z from the position of the distal end of the housing 2 to the position of the insulator leg part 31 of the distal end of the insulator 3. In the structure of the spark plug 1 according to the exemplary embodiment, the insulator projection length L (mm) represents a distance along the axial direction Z between the distal end surface 21 of the housing 2 and the insulator distal end surface 311 of the insulator 3.

The spark plug 1 according to the exemplary embodiment satisfies the relationship of L 2, and further satisfies the relationship of 0.8≤T≤1.

As shown in FIG. 2 and FIG. 3, the axial through hole 30 is composed of a distal end side hole 301, a slant hole 302 and a proximal side hole 303 arranged in order from the distal end side toward the proximal end side. The distal end side hole 301 is formed in the inside of the insulator leg part 31 of the distal end of the insulator 3. The distal end side hole 301 substantially has the same diameter along the longitudinal direction of the distal end side hole 301. The distal end of the inner circumferential wall of the distal end side hole 301 communicates with the insulator distal end surface 311 of the insulator 3.

The slant hole 302 has a taper shape which is tapered outwardly along the direction from the distal end side hole 301 toward the proximal side thereof.

The slant hole 302 is formed to communicate the distal end side hole 301 with the proximal side hole 303. As shown in FIG. 2, the slant hole 302 is formed slightly at the proximal side as compared with the position of the housing protruding part 23, the packing 40 and the insulator support surface 32.

As shown in FIG. 1 and FIG. 2, the proximal side hole 303 is formed extending from the slant hole 302 toward the proximal side. The proximal side hole 303 substantially has the same inner diameter in the axial direction Z and which is greater than the inner diameter of the distal end side hole 301.

As shown in FIG. 1, the central electrode 41, a glass sealing member 42, a resistance 43 and a terminal fitting 44 are arranged in the axial through hole 30 of the insulator 3.

A proximal side of the central electrode 41 has a diameter so as to project outwardly and be supported by the slant hole 302 of the axial through hole 30. The distal end of the central electrode 41 projects toward the distal end side of the axial through hole 30 of the insulator 3. The distal end surface of the central electrode 41 and the ground electrode 5 form a discharge gap G. Spark discharge is generated at the discharge gap G formed between the central electrode 41 and the ground electrode 5. The ground electrode 5 will be explained later.

The central electrode 41 is made of base material made of metal such as a nickel based alloy, etc., a core material having a superior thermal conductivity included in the base material, and a central tip. The central tip is made of noble metal or a noble metal alloy. It is acceptable to use iridium, platinum, etc. as noble metal.

The spark plug 1 according to the exemplary embodiment has the central electrode 41 composed of the base material made of a nickel based alloy, the core material made of copper, and the central tip made of an iridium alloy. As shown in FIG. 1, the resistance 43 is arranged at the proximal side in the axial through hole 30 through the glass sealing member 42.

The resistance 43 is produced by performing a heat sealing a resistance composite composed of a resistant material and glass powder. The resistant material is made of carbon, ceramic powder, etc. It is also acceptable to insert a cartridge type resistant into the axial through hole 30.

The glass sealing member 42 is made of copper glass produced by mixing copper powder into glass. The terminal fitting 44 is arranged at the proximal side of the resistance 43 through the glass sealing member 42 made of copper glass.

The terminal fitting 44 is made of iron alloy, for example. The spark plug 1 is electrically connected to the ignition coil (not shown) through the terminal fitting 44.

As shown in FIG. 1 and FIG. 2, the distal end surface 21 of the housing 2 is connected to the ground electrode 5. The ground electrode 5 has a rod-shaped part 51 and an extending part 52. The extending part 52 is formed extending inwardly from a front side of the rod-shaped part 51 through a curved part. That is, the overall ground electrode 5 has a character L shape. A part of the extending part 52 is arranged facing the distal end surface of the central electrode 41 in the axial direction Z. That is, in order to generate a spark discharge, the discharge gap G is formed between the distal end surface of the central electrode 41 (i.e. the distal end surface of the central tip) in the axial direction Z and the ground electrode 5.

For example, the ground electrode 5 is made of is made of base material made of metal such as a nickel based alloy, etc., a core material having a superior thermal conductivity included in the base material, and a ground tip. The ground tip is made of noble metal or a noble metal alloy. It is acceptable to use iridium, platinum, etc. as the noble metal.

The ground tip is arranged in the axial direction Z facing the distal end surface of the central electrode 41.

The spark plug 1 according to the exemplary embodiment has the ground electrode 5 composed of the base material made of a nickel based alloy, the core material made of copper, and the ground tip made of a platinum alloy.

Next, a description will now be given of the internal combustion engine 10 on which the spark plug 1 according to the exemplary embodiment is mounted.

The internal combustion engine 10 has a cylinder block 13, a piston 14 and a cylinder head 15. The piston 14 performs a reciprocating motion in the cylinder block 13 to convert a pressure into rotational motion. The cylinder block 13 is covered with the cylinder head 15. The combustion chamber 11 is formed by the cylinder block 13, the piston 14 and the cylinder head 15. The spark plug 1 according to the exemplary embodiment is attached to the plug hole 151 which communicate with the inside of the combustion chamber 11. The spark plug 1 is arranged to be exposed to the mixture gas introduced in the combustion chamber 11.

The internal combustion engine 10 has the intake air passage 12 and an exhaust gas passage 16. The intake air passage 12 communicates with the combustion chamber 11 so as to introduce an air into the inside of the combustion chamber 11. The exhaust gas passage 16 also communicates with the combustion chamber 11. The exhaust gas in the combustion chamber 11 is discharged outside through the exhaust gas passage 16.

As shown in FIG. 4, the intake air passage 12 is composed of an intake air port and an intake air manifold. The intake airport is formed in the cylinder head 15 to communicate with the combustion chamber 11. The intake air manifold is attached to the cylinder head 15.

The internal combustion engine 10 has an intake air valve 17 and an exhaust gas valve 18. The intake air valve 17 opens and closes the intake air opening at the combustion chamber 11 side in the intake air passage 12. The exhaust gas valve 18 opens and closes the exhaust gas opening at the combustion chamber 11 side in the exhaust gas passage 16.

A throttle valve 19 is arranged in the intake air passage 12 in the internal combustion engine 10 so as to adjust an intake air amount according to an accelerator opening position.

The water spray injector 6 is arranged in the internal combustion engine 10 so as to spray water mist into the combustion chamber. The water spray injector 6 is arranged in the intake air passage 12 so as to spray water mist into a location close to the combustion chamber 11.

The water spray injector 6 injects, i.e. sprays water mist into the combustion chamber 11 before a combustion of a fuel mixture gas in each combustion cycle, for example. This cools the inside of the combustion chamber 11 by the sprayed water mist. That is, this prevents knocking from occurring in the combustion chamber 11, and improves a compression ratio and the thermal efficiency of the internal combustion engine 10.

A fuel injector 7 is arranged in the internal combustion engine 10. The fuel injector 7 injects a fuel into the inside of the combustion chamber 11. The distal end of the fuel injector 7 is arranged to be exposed to the inside of the combustion chamber 11, and directly injects a fuel into the inside of the combustion chamber 11. The internal combustion engine 10 has the structure previously described.

Figure 5:
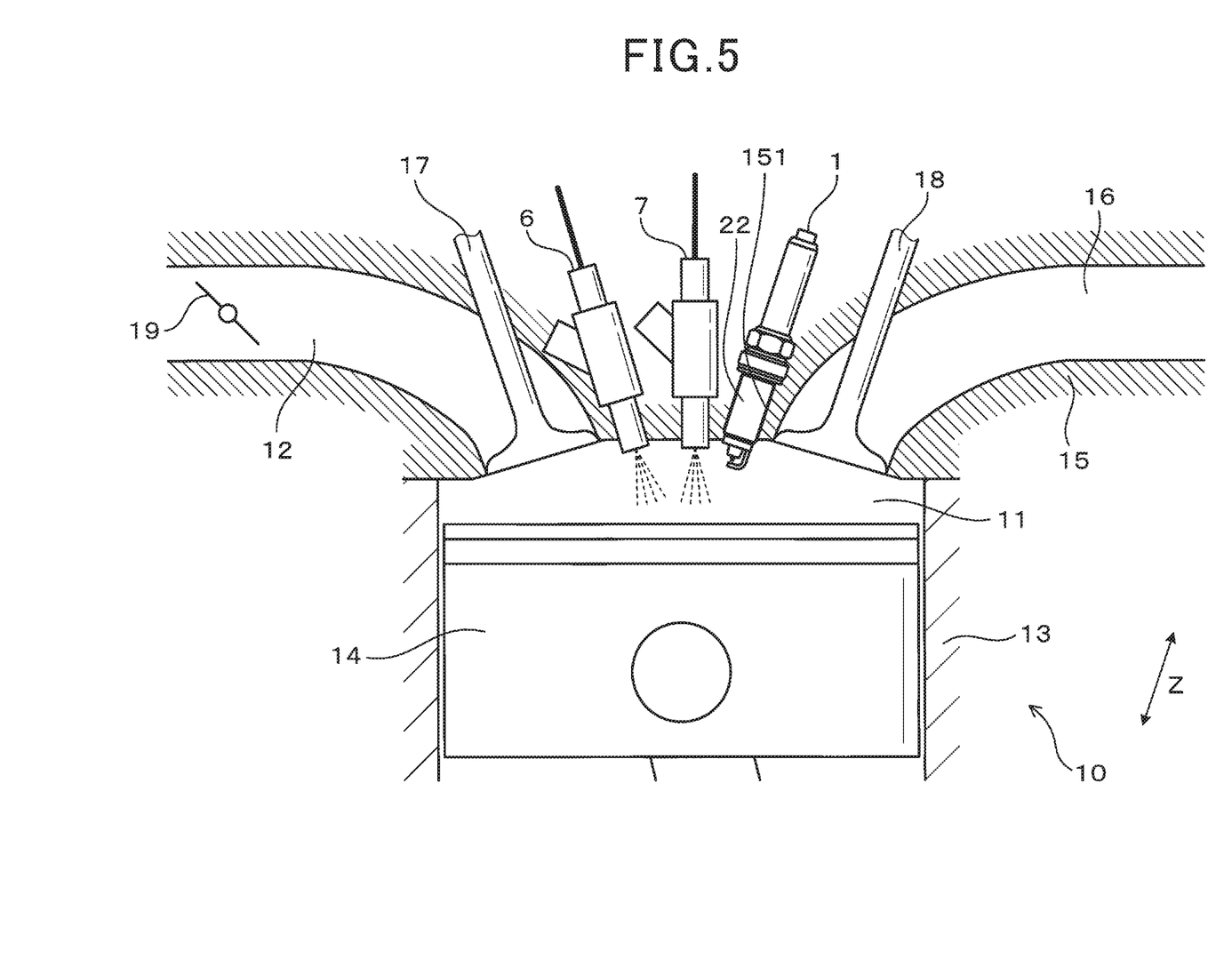
FIG. 5 is a view schematically showing a cross section of a modification of the internal combustion engine equipped with the spark plug according to the exemplary embodiment.

The present disclosure is not limited by the structure of the internal combustion engine 10 previously described. FIG. 5 is a view schematically showing a cross section of a modification of the internal combustion engine 10 equipped with the spark plug 1 according to the exemplary embodiment. As shown in FIG. 5, it is acceptable for the internal combustion engine 10 to have a structure in which the water spray injector 6 is arranged to be exposed to the inside of the combustion chamber 11 so as to directly spray water mist into the inside of the combustion chamber 11.

Figure 6:
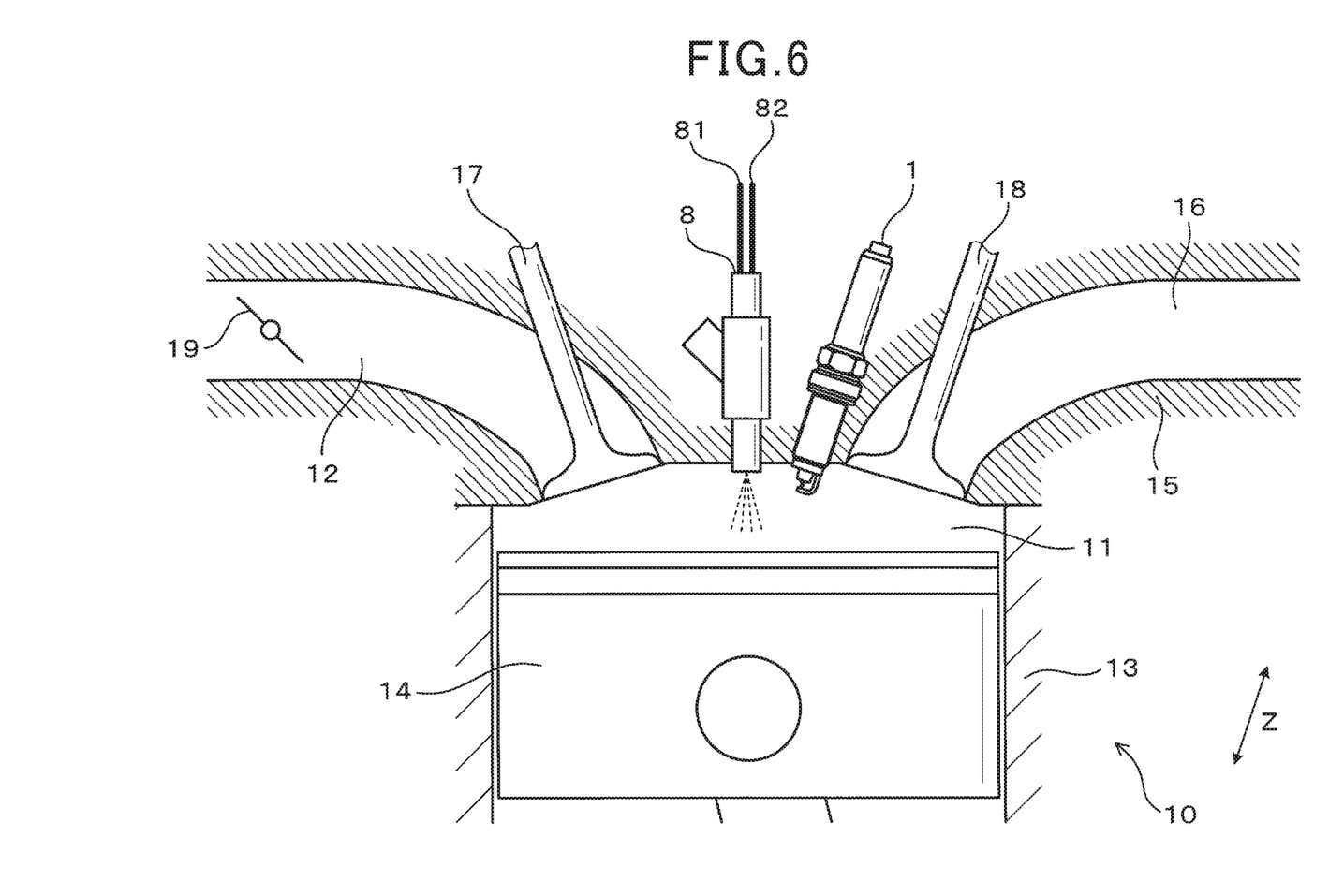
FIG. 6 is a view schematically showing a cross section of another modification of the internal combustion engine equipped with the spark plug according to the exemplary embodiment.

FIG. 6 is a view schematically showing a cross section of another modification of the internal combustion engine 10 equipped with the spark plug 1 according to the exemplary embodiment. As shown in FIG. 6, it is further acceptable for the internal combustion engine 10 to have a common injector 8 which sprays water mist and injects a fuel into the inside of the combustion chamber 11. As schematically shown in FIG. 6, the common injector 8 is joined to a water supply line 81 and a fuel supply line 82. Water is supplied to the common injector 8 through the water supply line 81. Fuel is supplied to the common injector 8 through the fuel supply line 82. That is, the common injector 8 directly sprays water mist and injects a fuel into the combustion chamber 11. For example, the common injector 8 injects a mixture of water and fuel into the combustion chamber 11, or sprays water mist and injects a fuel into the combustion chamber 11, respectively. In the latter case, it is possible for the common injector 8 to spray water mist and inject a fuel at the same timing or at a different timing, respectively.

It is possible for the internal combustion engine 10 to have various structures so long as the water spray injector 6 has a structure capable of spraying water mist into at least one of the combustion chamber 11 and the intake air passage 12.

A description will be given of effects and behavior of the spark plug 1 according to the exemplary embodiment.

The spark plug 1 according to the exemplary embodiment has the specific structure which satisfies the relationship designated by the equation (I).

$$-0.064L^2+0.26L+0.53 \leq T \leq 0.07L^2-0.35L+1.36 \qquad (I),$$

where T indicates the thickness T (mm) of the insulator distal end of the insulator 3, and L indicates the insulator projection length L (mm) measured from the position of the distal end of the housing 2 to the position at the insulator distal end surface 311 of the insulator 3. This improved structure makes it possible to suppress generation of cracks in the insulator 3 in the spark plug 1. The improved structure and features of the speak plug 1 are supported by experimental results described later.

In the improved structure of the spark plug 1 according to the exemplary embodiment, the insulator projection length L (mm) satisfied a relationship of $L \leq 2$. This makes it possible to suppress a pre-ignition from being generated in the combustion chamber 11. That is, when the insulator projection length L exceeds 2 mm (L>2), a total area of the insulator to be exposed to the combustion chamber 11 is increased more because the distal end of the insulator leg part 31 of the insulator 3 more projects from the exposed to the distal end surface 21 of the housing 2. Accordingly, this arrangement makes it possible to easily increase a temperature of the distal end of the insulator leg part 31 of the insulator 3, which is exposed to the inside of the combustion chamber 11. As a result, this arrangement introduces a risk of possible pre-ignition in the combustion chamber 11. In order to avoid occurrence of pre-ignition, it is preferable for the insulator projection length L (mm) of the insulator distal end of the insulator 3 to be not more than 2 mm.

Further, in the improved structure of the spark plug 1 according to the exemplary embodiment, the thickness T (mm) of the insulator distal end of the insulator 3 satisfies the relationship of $0.8 \leq T \leq 1$. This makes it possible to suppress generation of cracks in the insulator 3 with high efficiency. The improved structure and features of the speak plug 1 are supported by experimental results described later.

As previously described, the exemplary embodiment of the present disclosure provides the spark plug 1 according to the exemplary embodiment to be mounted on the internal combustion engine equipped with the water spray injector. The water spray injector sprays water mist into at least one of the combustion chamber 11 and the intake air passage 12. The spark plug 1 according to the exemplary embodiment has the improved structure of suppressing generation of cracks in the insulator. That is, the spark plug 1 according to the exemplary embodiment has the feature of suppressing the insulator 3 from being fractured.

Experiment

A description will now be given of experimental results and evaluation results of test samples as the spark plug 1 according to the exemplary embodiment.

The experiment detected the relationship between the thickness T (mm) of the insulator distal end of the insulator 3, the insulator projection length L (mm) and a degree in resistance to fracture of the insulator 3 in each test sample.

The experiment used the test samples, each of which has a different thickness T (mm) of the insulator distal end of the insulator 3, a different insulator projection length L.

The experiment varied a distal end outer diameter of the insulator 3 in each test sample so as to adjust the thickness T (mm) of the insulator distal end of the insulator 3. Further, the experiment varied the length in the axial direction Z of the insulator leg part 31 at the distal end of the insulator 3 so as to adjust the insulator projection length L in each test sample. In each test sample, the screw attachment 22 of the housing 2 had the same nominal diameter M12 (JIS: The Japanese Industrial Standard)

The experiment heated the insulator leg part 31 at the distal end of the insulator 3 in each test sample at 800° C. After this, the experiment sprayed water mist of 40 mg at 20° C. to the part of the insulator leg part 31 in each test sample projected outside from the housing 2. The experiment performed the dye penetrant inspection (or the red check method) so as to detect whether cracks is generated in the insulator 3 in each test sample. This dye penetrant inspection (DP), also called liquid penetrate inspection (LPI) or penetrant testing (PT), is a widely applied and low-cost inspection method used to check surface-breaking defects in metals, plastics, or ceramics.

The experiment evaluated a degree in resistance to fracture of the insulator 3 in each test sample by using the following evaluation method. The experiment prepared a plurality of the test samples. Each of the plurality of test samples corresponds to a respective coordinate point, as designated by character "0" and character "X" shown in FIG. 7. The experiment prepared five pieces as each of the plurality of test samples. That is, the plurality of test samples had a respective different combination of the thickness T (mm) of the insulator distal end of the insulator 3 and the insulator projection length L (mm). Each of the plurality of test samples is composed of five pieces having the same combination of the thickness T (mm) of the insulator distal end of the insulator 3 and the insulator projection length L (mm).

The experiment evaluated each test sample as a beneficial evaluation result designated by character "0" when no crack was generated in the insulator 3 in the overall test pieces in each test sample. On the other hand, the experiment evaluated each test sample as an evaluation result of X (Poor) when at least one crack was generated in the insulator 3 in the overall test pieces in each test sample.

Figure 7:
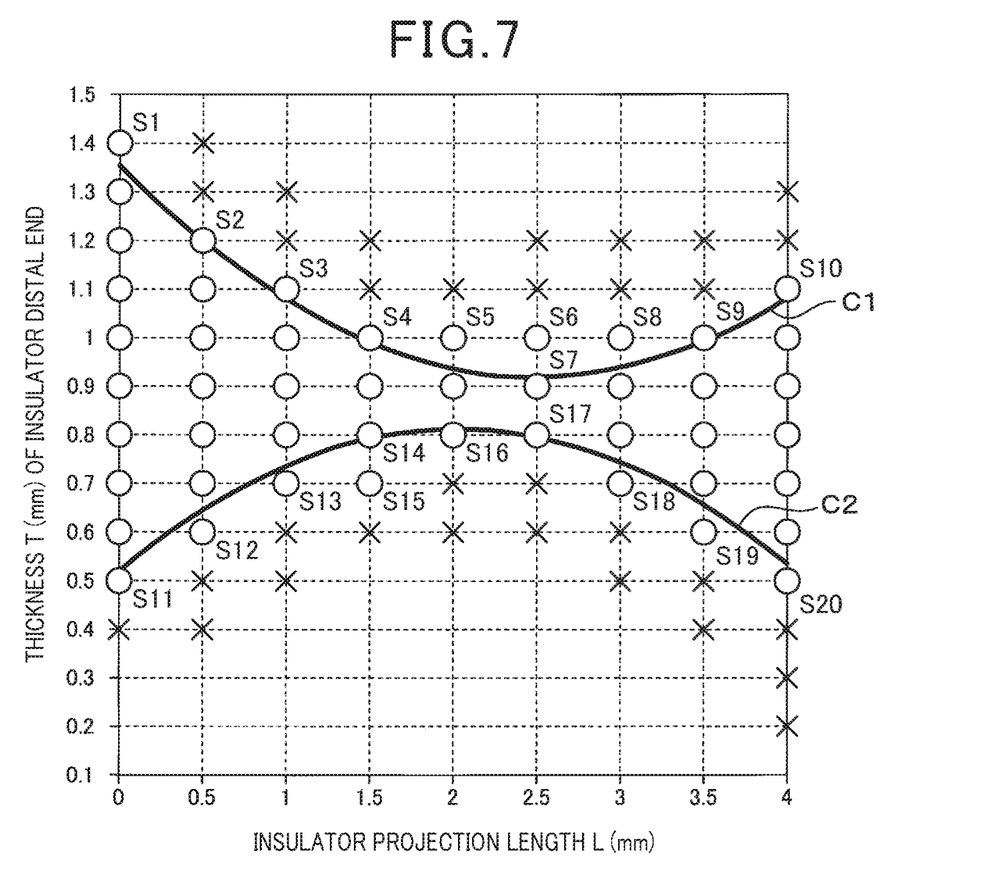
FIG. 7 is a graph showing a relationship between the length of the projection part of the insulator leg part of the insulator, the thickness of the insulator leg part at the distal end of the insulator, and a resistance to crack generation in the insulator in each of test samples.

That is, the evaluation result "0" indicates a beneficial combination of the thickness T (mm) of the insulator distal end of the insulator 3 and the insulator projection length L (mm) capable of avoiding the insulator from being fractured. On the other hand, the evaluation result "x" indicates an incorrect combination of the thickness T (mm) of the insulator distal end of the insulator 3 and the insulator projection length L (mm) capable of avoiding the insulator from being fractured. FIG. 7 shows the evaluation results of the test samples. That is, FIG. 7 is a graph showing the relationship between the length L (mm) of the projection part of the insulator leg part 31 of the insulator, the thickness T (mm) of the insulator distal end of the insulator 3, and a resistance to crack generation in the insulator 3 in each of test sample.

As shown in FIG. 7, the zone above the curved line C1 includes the test samples having the maximum thickness T (mm) of the insulator distal end of the insulator 3 in the test samples designated by the beneficial evaluation result "0". The curved line C1 indicates an approximate quadratic curve which satisfies the equation of $T=0.07L^2-0.35L+1.36$.

As shown in FIG. 7, the zone below the curved line C2 includes the test samples having the minimum thickness T (mm) of the insulator distal end of the insulator 3 in the test samples designated by the evaluation "O". The curved line C2 indicates an approximate quadratic curve which satisfies the equation of $T=-0.064L^2+0.26L+0.53$.

That is, the test samples plotted in the zone between the curved line C1 and the curved line C2 satisfy the relationship designated by the equation (I):

$$-0.064L^2+0.26L+0.53 \leq T \leq 0.07L^2-0.35L+1.36 \quad (I).$$

It can be recognized from the evaluation results shown in FIG. 7 that the test samples satisfying the relationship indicated by the equation (I), i.e., plotted below the curved line C1 and above the curved line C2, have the beneficial evaluation result designated by the character "O".

Further, as shown in FIG. 7, it can be recognized that the test samples S1 to S10 plotted adjacent to and above the curved line C1, and the test samples S11 to S20 plotted adjacent to and below the curved line C2 have the beneficial evaluation result designated by the character "O".

On the basis of the evaluation results previously described, it is possible to reliably suppress the insulator of the spark plug 1 from being fractured by correctly adjusting the length L (mm) of the projection part of the insulator leg part 31 of the insulator 3 and the thickness T (mm) of the insulator distal end of the insulator 3 which satisfy the relationship designated by the equation (I).

It can be recognized from the evaluation results shown in FIG. 7 that the test samples, which satisfy the relationship of $0.8 \leq T \leq 1$, have the beneficial evaluation result designated by the character "0", where T indicates the thickness T (mm) of the insulator distal end of the insulator 3.

When the structure of the spark plug 1 satisfies the relationship of $0.8 \leq T \leq 1$, in addition to the condition represented by the equation (I), it is possible to provide the spark plug 1 capable of preventing the insulator 3 from being fractured.

In the zone above the curved line C1 shown in FIG. 7, which satisfies the relationship of $T>0.07L^2-0.35L+1.36$, the thickness of the insulator leg part 31 of the insulator 3 of the test samples becomes excessively thick. In this structure, when water mist is sprayed onto the surface of the insulator leg part 31 of the insulator 3, this reduces a temperature difference between the inner circumferential surface and the outer peripheral surface of the insulator 3. Because this easily increases a thermal stress in the inside of the insulator leg part 31 of the insulator 3, it can be considered for the insulator 3 to be easily fractured due to the generated thermal stress.

In the zone below the curved line C2 shown in FIG. 7, which satisfies the relationship of $T<-0.064L^2+0.26L+0.53$, the thickness of the insulator leg part 31 of the insulator 3 of the test samples becomes excessively thin. Because this structure reduces the thermal capacity of the insulator leg part 31, the thermal energy of the insulator leg part 31 is drastically reduced when water mist is sprayed onto the surface of the insulator leg part 31 of the insulator 3. Accordingly, this structure increases a temperature difference between the area with water mist and the part around the surrounding area thereof, and the thermal stress is generated in the insulator leg part 31, and this easily causes generation of cracks in the insulator 3. As a result, it can be estimated for the insulator 3 to be easily fractured due to the generated thermal stress.

It can be considered from the evaluation results shown in FIG. 7 that the range of the thickness T (mm) of the distal end of the insulator 3 in the test samples having the beneficial evaluation result designated by the character "0" is more reduced according to length L (mm) increase of the projection part of the insulator leg part 31. However, when the length L (mm) of the projection part of the insulator leg part 31 excesses a predetermined value, the range of the test samples having the beneficial evaluation result designated by the character "0" is increased. That is, the range of the thickness T (mm) of the insulator distal end of the insulator 3 in the test samples having the beneficial evaluation result designated by the character "0" is more increased from the central part toward the righthand side shown in FIG. 7. The reason why this is as follows.

When the thickness T (mm) of the insulator distal end of the insulator 3 becomes more than the predetermined value, the thermal capacity of the insulator leg part 31 is increased. Accordingly, even if water mist is attached on the surface of the insulator leg part 31, the temperature reduction of the insulator leg part 31 becomes small. This prevents a temperature difference between the part on which water mist is attached and the surrounding area thereof from being increased, and this also prevent generation of large thermal stress in the insulator 3 of the spark plug 1.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A spark plug to be mounted on an internal combustion engine, the internal combustion engine comprising a combustion chamber, an intake air passage supplying intake air into the combustion chamber and a water spray injector spraying water mist into at least one of the combustion chamber and the intake air passage, the spark plug comprising:

a housing having a cylindrical shape; and an insulator having a cylindrical shape supported inside the housing, wherein a position of an insulator distal end at a distal end of the insulator is arranged equal to or forward of a position of a distal end of the housing in an axial direction of the spark plug, and the spark plug satisfies a relationship designated by the equation (I):

$$-0.064L^2+0.26L+0.53 \leq T \leq 0.07L^2-0.35L+1.36 \quad (I),$$

where T indicates a thickness mm of the insulator distal end, and L indicates an insulator projection length mm measured from the position of the distal end of the housing to the position at the insulator distal end surface of the insulator.

2. The spark plug according to claim 1, wherein the insulator projection length L mm satisfies a relationship of $L \leq 2$.

3. The spark plug according to claim 1, wherein the thickness T mm of the insulator distal end of the insulator satisfies a relationship of $0.8 \leq T \leq 1$.

4. The spark plug according to claim 2, wherein the thickness T mm of the insulator distal end of the insulator satisfies a relationship of $0.8 \leq T \leq 1$.

* * * * *